(12) United States Patent
Yoon et al.

(10) Patent No.: US 12,732,582 B2
(45) Date of Patent: Sep. 8, 2026

(54) SYSTEM AND METHOD FOR DISTRIBUTED IMAGE RECORDING AND STORAGE FOR CHARGED PARTICLE SYSTEMS

(71) Applicant: ASML Netherlands B.V., Veldhoven (NL)

(72) Inventors: Myunghoon Yoon, Sunnyvale, CA (US); Wen-Ting Tai, Fremont, CA (US); Yunxiang Chai, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 254 days.

(21) Appl. No.: 18/556,886

(22) PCT Filed: Apr. 21, 2022

(86) PCT No.: PCT/EP2022/060638
§ 371 (c)(1),
(2) Date: Oct. 23, 2023

(87) PCT Pub. No.: WO2022/233591
PCT Pub. Date: Nov. 10, 2022

(65) Prior Publication Data

US 2024/0205347 A1 Jun. 20, 2024

Related U.S. Application Data

(60) Provisional application No. 63/184,142, filed on May 4, 2021.

(51) Int. Cl.
*G06F 16/51* (2019.01)
*G06T 7/00* (2017.01)
*H04N 1/21* (2006.01)

(52) U.S. Cl.
CPC ......... *H04N 1/2166* (2013.01); *G06T 7/0004* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS 6,578,188 B1 * 6/2003 Pang .......................... G03F 1/26 977/839
2008/0065645 A1 * 3/2008 Eichhorn .............. G06F 16/532 707/E17.031

(Continued)

FOREIGN PATENT DOCUMENTS

JP H0451441 * 2/1992 ............. G01B 15/00
JP 2006130058 * 5/2006 ............... A61B 6/00

(Continued)

OTHER PUBLICATIONS

PCT International Search Report issued in related PCT International Application No. PCT/EP2022/060638; mailed Aug. 22, 2022 (2 pgs.).

*Primary Examiner* — Beniyam Menberu
(74) *Attorney, Agent, or Firm* — Finnegan, Henderson, Farabow, Garrett & Dunner LLP

(57) ABSTRACT

Apparatuses, systems, and methods for distributed image recording and storage for charged particle tools are provided. In some embodiments, a system may include a first storage of a data center, the first storage configured to store a plurality of images acquired from a plurality of scanning charged particle microscope (SCPM) tools; an image hub server of the data center, the image hub server configured to: receive a first query from an application for a location of a first image generated by a first SCPM tool of the plurality of SCPM tools; determine that the location of the first image is (Continued)

the first storage; and transfer the first image from the first storage to the application for inspection analysis of the first image.

20 Claims, 6 Drawing Sheets

(56) References Cited

U.S. PATENT DOCUMENTS

| | | | | |
|---|---|---|---|---|
| 2020/0018944 | A1* | 1/2020 | Fang | G06N 20/00 |
| 2020/0278303 | A1* | 9/2020 | Tada | G01N 23/2076 |
| 2022/0261973 | A1* | 8/2022 | Komatsuzaki | G06F 18/23213 |

FOREIGN PATENT DOCUMENTS

| | | | | |
|---|---|---|---|---|
| JP | 2011114043 | * | 6/2011 | G01B 15/04 |
| JP | 2016200444 | * | 12/2016 | G01N 21/88 |
| JP | 2018120271 | * | 8/2018 | G16H 10/00 |

* cited by examiner

300

400

SYSTEM AND METHOD FOR DISTRIBUTED IMAGE RECORDING AND STORAGE FOR CHARGED PARTICLE SYSTEMS

CROSS-REFERENCE TO RELATED APPLICATIONS

This application claims priority to International Application No. PCT/EP2022/060638, filed 21 Apr. 2022, and published as WO 2022/233591 A1, which claims priority of U.S. application 63/184,142, which was filed on 4 May 2021 The contents of these applications are incorporated herein by reference in their entireties.

FIELD

The description herein relates to the field of charged particle beam systems, and more particularly to systems for distributed image recording and storage for charged particle beam system inspection systems.

BACKGROUND

In manufacturing processes of integrated circuits (ICs), unfinished or finished circuit components are inspected to ensure that they are manufactured according to design and are free of defects. An inspection system utilizing an optical microscope typically has resolution down to a few hundred nanometers; and the resolution is limited by the wavelength of light. As the physical sizes of IC components continue to reduce down to sub-100 or even sub-10 nanometers, inspection systems capable of higher resolution than those utilizing optical microscopes are needed.

A charged particle (e.g., electron) beam microscope, such as a scanning electron microscope (SEM) or a transmission electron microscope (TEM), capable of resolution down to less than a nanometer, serves as a practicable tool for inspecting IC components having a feature size that is sub-100 nanometers. With a SEM, electrons of a single primary electron beam, or electrons of a plurality of primary electron beams, can be focused at locations of interest of a wafer under inspection. The primary electrons interact with the wafer and may be backscattered or may cause the wafer to emit secondary electrons. The intensity of the electron beams comprising the backscattered electrons and the secondary electrons may vary based on the properties of the internal and external structures of the wafer, and thereby may indicate whether the wafer has defects.

SUMMARY

Embodiments of the present disclosure provide apparatuses, systems, and methods for distributed image recording and storage for charged particle tools. In some embodiments, a system may include a first storage of a data center, the first storage configured to store a plurality of images acquired from a plurality of scanning charged particle microscope (SCPM) tools; an image hub server of the data center, the image hub server configured to: receive a first query from an application for a location of a first image generated by a first SCPM tool of the plurality of SCPM tools; determine that the location of the first image is the first storage; and transfer the first image from the first storage to the application for inspection analysis of the first image.

In some embodiments, a method for distributed image recording and storage for charged particle tools may include storing a plurality of images acquired from a plurality of scanning charged particle microscope (SCPM) tools in a first storage of a data center; receiving, by an image hub server of the data center, a first query from an application for a location of a first image generated by a first SCPM tool of the plurality of SCPM tools; determining, by the image hub server of the data center, that the location of the first image is the first storage; and transferring, by the image hub server of the data center, the first image from the first storage to the application for inspection analysis of the first image.

In some embodiments, a non-transitory computer readable medium may store a set of instructions that is executable by at least one processor of a data hub to cause the data hub to perform a method for distributed image recording and storage for charged particle tools. The method may include storing a plurality of images acquired from a plurality of scanning charged particle microscope (SCPM) tools in a first storage of a data center; receiving, by an image hub server of the data center, a first query from an application for a location of a first image generated by a first SCPM tool of the plurality of SCPM tools; determining, by the image hub server of the data center, that the location of the first image is the first storage; and transferring, by the image hub server of the data center, the first image from the first storage to the application for inspection analysis of the first image.

DETAILED DESCRIPTION

Figure 1:
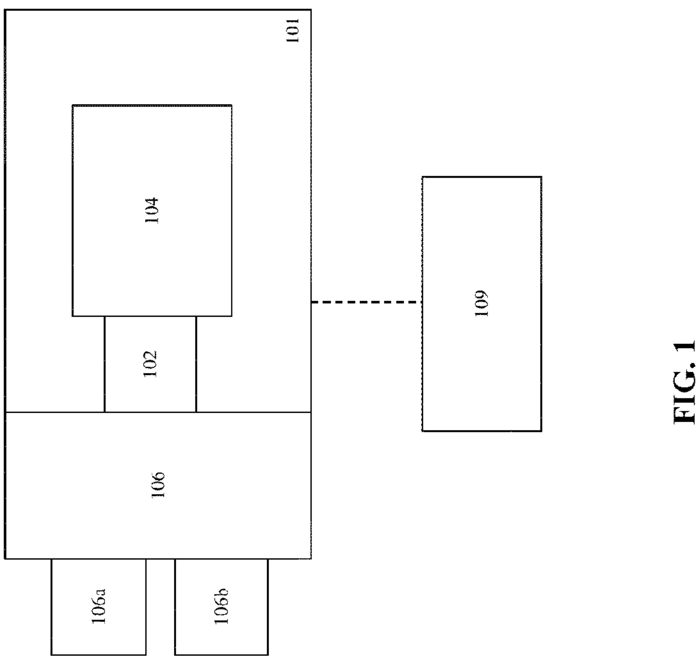
FIG. 1 is a schematic diagram illustrating an exemplary electron beam inspection (EBI) system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For example, although some embodiments are described in the context of utilizing electron beams, the disclosure is not so limited. Other types of charged particle beams may be similarly applied. Furthermore, other imaging systems may be used, such as optical imaging, photodetection, x-ray detection, extreme ultraviolet inspection, deep ultraviolet inspection, or the like.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection may be carried out using a scanning electron microscope (SEM). A SEM can be used to image these extremely small structures, in effect, taking a "picture" of the structures of the wafer. The image can be used to determine if the structure was formed properly and also if it was formed at the proper location. If the structure is defective, then the process can be adjusted so the defect is less likely to recur. Defects may be generated during various stages of semiconductor processing. For the reason stated above, it is important to find defects accurately and efficiently as early as possible.

The working principle of a SEM is similar to a camera. A camera takes a picture by receiving and recording brightness and colors of light reflected or emitted from people or objects. A SEM takes a "picture" by receiving and recording energies or quantities of electrons reflected or emitted from the structures. Before taking such a "picture." an electron beam may be provided onto the structures, and when the electrons are reflected or emitted ("exiting") from the structures, a detector of the SEM may receive and record the energies or quantities of those electrons to generate an image. To take such a "picture," some SEMs use a single electron beam (referred to as a "single-beam SEM"), while some SEMs use multiple electron beams (referred to as a "multi-beam SEM") to take multiple "pictures" of the wafer. By using multiple electron beams, the SEM may provide more electron beams onto the structures for obtaining these multiple "pictures," resulting in more electrons exiting from the structures. Accordingly, the detector may receive more exiting electrons simultaneously, and generate images of the structures of the wafer with a higher efficiency and a faster speed.

In order to inspect samples for defects, the SEM images may be electronically obtained from the SEM tool. A single SEM tool typically records SEM images to its own storage and manages its own data. However, these typical methods of storing SEM images and managing SEM tool data suffer from constraints. For example, the systems for storing SEM images and managing SEM tool data need to be installed in the same room as the SEM tool and positioned near the SEM tool. This configuration may be costly since SEM tools are sensitive to environmental factors and, therefore, need to be operated in clean rooms, which are limited in space.

Moreover, multiple SEM tools may need to be used simultaneously to inspect multiple samples. However, typical methods of storing SEM images and managing SEM tool data for multiple SEM tools is costly because each SEM tool needs its own storage and data management system.

Furthermore, SEM images are manually copied to another analysis platform (e.g., eManager Server) for advanced analysis of the sample under inspection such that SEM images cannot be obtained for analysis in real-time (e.g., obtained as a SEM tool generates an image).

Some of the disclosed embodiments provide systems and methods that address some or all of these disadvantages by providing distributive SEM image recording or storage for one or more SEM tools in real-time and at high-speed. The disclosed embodiments may provide a system that may be shared by one or more SEM tools for storing and managing data, thereby increasing throughput and reducing costs of sample inspection analyses. The disclosed embodiments provide systems and methods that may increase throughput and reduce costs of sample inspection analyses even over slower networks with lower bandwidths.

Relative dimensions of components in drawings may be exaggerated for clarity. Within the following description of drawings, the same or like reference numbers refer to the same or like components or entities, and only the differences with respect to the individual embodiments are described.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an exemplary electron beam inspection (EBI) system 100 consistent with embodiments of the present disclosure. EBI system 100 may be used for imaging. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port **106*a* and a second loading port 106*b*. EFEM 106 may include additional loading port (s). First loading port 106*a* and second loading port 106*b*** receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104. Electron beam tool 104 may be a single-beam system or a multi-beam system.

A controller 109 is electronically connected to electron beam tool 104. Controller 109 may be a computer configured to execute various controls of EBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

Figure 2:
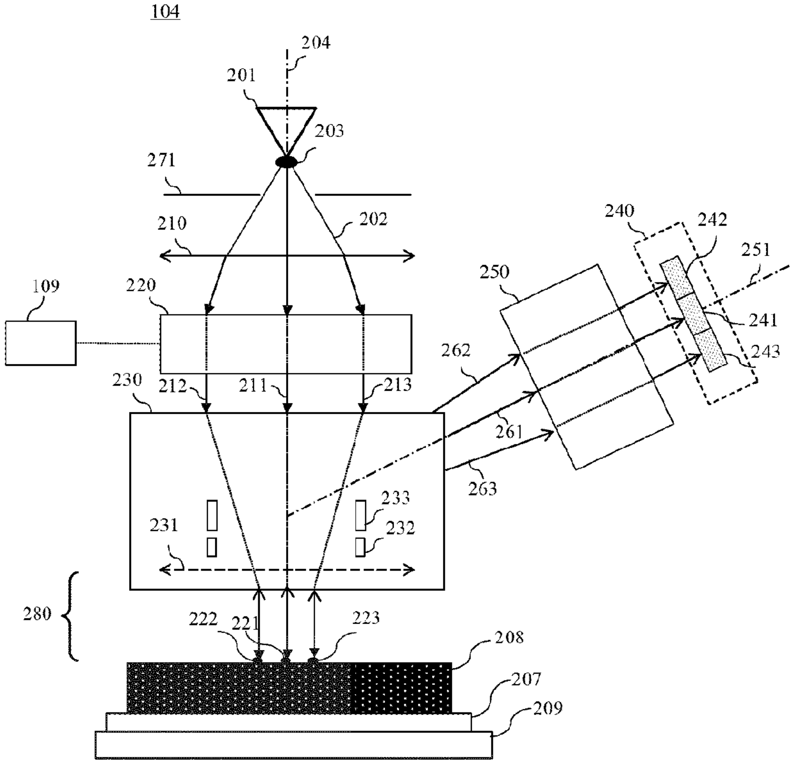
FIG. 2 is a schematic diagram illustrating an exemplary multi-beam system that is part of the exemplary charged particle beam inspection system of FIG. 1, consistent with embodiments of the present disclosure.

Reference is now made to FIG. 2, which is a schematic diagram illustrating an exemplary electron beam tool 104 including a multi-beam inspection tool that is part of the EBI system 100 of FIG. 1, consistent with embodiments of the present disclosure. In some embodiments, electron beam tool 104 may be operated as a single-beam inspection tool that is part of EBI system 100 of FIG. 1. Multi-beam electron beam tool 104 (also referred to herein as apparatus 104) comprises an electron source 201, a Coulomb aperture plate (or "gun aperture plate") 271, a condenser lens 210, a source conversion unit 220, a primary projection system 230, a motorized stage 209, and a sample holder 207 supported by motorized stage 209 to hold a sample 208 (e.g., a wafer or a photomask) to be inspected. Multi-beam electron beam tool 104 may further comprise a secondary projection system 250 and an electron detection device 240. Primary projection system 230 may comprise an objective lens 231. Electron detection device 240 may comprise a plurality of detection elements 241, 242, and 243. A beam separator 233 and a deflection scanning unit 232 may be positioned inside primary projection system 230.

Electron source 201, Coulomb aperture plate 271, condenser lens 210, source conversion unit 220, beam separator 233, deflection scanning unit 232, and primary projection system 230 may be aligned with a primary optical axis 204 of apparatus 104. Secondary projection system 250 and electron detection device 240 may be aligned with a secondary optical axis 251 of apparatus 104.

Electron source 201 may comprise a cathode (not shown) and an extractor or anode (not shown), in which, during operation, electron source 201 is configured to emit primary electrons from the cathode and the primary electrons are extracted or accelerated by the extractor and/or the anode to form a primary electron beam 202 that form a primary beam crossover (virtual or real) 203. Primary electron beam 202 may be visualized as being emitted from primary beam crossover 203.

Source conversion unit 220 may comprise an image-forming element array (not shown), an aberration compensator array (not shown), a beam-limit aperture array (not shown), and a pre-bending micro-deflector array (not shown). In some embodiments, the pre-bending micro-deflector array deflects a plurality of primary beamlets 211, 212, 213 of primary electron beam 202 to normally enter the beam-limit aperture array, the image-forming element array, and an aberration compensator array. In some embodiments, apparatus 104 may be operated as a single-beam system such that a single primary beamlet is generated. In some embodiments, condenser lens 210 is designed to focus primary electron beam 202 to become a parallel beam and be normally incident onto source conversion unit 220. The image-forming element array may comprise a plurality of micro-deflectors or micro-lenses to influence the plurality of primary beamlets 211, 212, 213 of primary electron beam 202 and to form a plurality of parallel images (virtual or real) of primary beam crossover 203, one for each of the primary beamlets 211, 212, and 213. In some embodiments, the aberration compensator array may comprise a field curvature compensator array (not shown) and an astigmatism compensator array (not shown). The field curvature compensator array may comprise a plurality of micro-lenses to compensate field curvature aberrations of the primary beamlets 211, 212, and 213. The astigmatism compensator array may comprise a plurality of micro-stigmators to compensate astigmatism aberrations of the primary beamlets 211, 212, and 213. The beam-limit aperture array may be configured to limit diameters of individual primary beamlets 211, 212, and 213. FIG. 2 shows three primary beamlets 211, 212, and 213 as an example, and it is appreciated that source conversion unit 220 may be configured to form any number of primary beamlets. Controller 109 may be connected to various parts of EBI system 100 of FIG. 1, such as source conversion unit 220, electron detection device 240, primary projection system 230, or motorized stage 209. In some embodiments, as explained in further details below, controller 109 may perform various image and signal processing functions. Controller 109 may also generate various control signals to govern operations of the charged particle beam inspection system.

Condenser lens 210 is configured to focus primary electron beam 202. Condenser lens 210 may further be configured to adjust electric currents of primary beamlets 211, 212, and 213 downstream of source conversion unit 220 by varying the focusing power of condenser lens 210. Alternatively, the electric currents may be changed by altering the radial sizes of beam-limit apertures within the beam-limit aperture array corresponding to the individual primary beamlets. The electric currents may be changed by both altering the radial sizes of beam-limit apertures and the focusing power of condenser lens 210. Condenser lens 210 may be an adjustable condenser lens that may be configured so that the position of its first principle plane is movable. The adjustable condenser lens may be configured to be magnetic, which may result in off-axis beamlets 212 and 213 illuminating source conversion unit 220 with rotation angles. The rotation angles change with the focusing power or the position of the first principal plane of the adjustable condenser lens. Condenser lens 210 may be an anti-rotation condenser lens that may be configured to keep the rotation angles unchanged while the focusing power of condenser lens 210 is changed. In some embodiments, condenser lens 210 may be an adjustable anti-rotation condenser lens, in which the rotation angles do not change when its focusing power and the position of its first principal plane are varied.

Objective lens 231 may be configured to focus beamlets 211, 212, and 213 onto a sample 208 for inspection and may form, in the current embodiments, three probe spots 221, 222, and 223 on the surface of sample 208. Coulomb aperture plate 271, in operation, is configured to block off peripheral electrons of primary electron beam 202 to reduce Coulomb effect. The Coulomb effect may enlarge the size of each of probe spots 221, 222, and 223 of primary beamlets 211, 212, 213, and therefore deteriorate inspection resolution.

Beam separator 233 may, for example, be a Wien filter comprising an electrostatic deflector generating an electrostatic dipole field and a magnetic dipole field (not shown in FIG. 2). In operation, beam separator 233 may be configured to exert an electrostatic force by electrostatic dipole field on individual electrons of primary beamlets 211, 212, and 213. The electrostatic force is equal in magnitude but opposite in direction to the magnetic force exerted by magnetic dipole field of beam separator 233 on the individual electrons. Primary beamlets 211, 212, and 213 may therefore pass at least substantially straight through beam separator 233 with at least substantially zero deflection angles.

Deflection scanning unit 232, in operation, is configured to deflect primary beamlets 211, 212, and 213 to scan probe spots 221, 222, and 223 across individual scanning areas in a section of the surface of sample 208. In response to incidence of primary beamlets 211, 212, and 213 or probe spots 221, 222, and 223 on sample 208, electrons emerge from sample 208 and generate three secondary electron beams 261, 262, and 263. Each of secondary electron beams 261, 262, and 263 typically comprise secondary electrons (having electron energy≤50 eV) and backscattered electrons (having electron energy between 50 eV and the landing energy of primary beamlets 211, 212, and 213). Beam separator 233 is configured to deflect secondary electron beams 261, 262, and 263 towards secondary projection system 250. Secondary projection system 250 subsequently focuses secondary electron beams 261, 262, and 263 onto detection elements 241, 242, and 243 of electron detection device 240. Detection elements 241, 242, and 243 are arranged to detect corresponding secondary electron beams 261, 262, and 263 and generate corresponding signals which are sent to controller 109 or a signal processing system (not shown), e.g., to construct images of the corresponding scanned areas of sample 208.

In some embodiments, detection elements 241, 242, and 243 detect corresponding secondary electron beams 261, 262, and 263, respectively, and generate corresponding intensity signal outputs (not shown) to an image processing system (e.g., controller 109). In some embodiments, each detection element 241, 242, and 243 may comprise one or more pixels. The intensity signal output of a detection element may be a sum of signals generated by all the pixels within the detection element.

In some embodiments, controller 109 may comprise image processing system that includes an image acquirer (not shown), a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 240 of apparatus 104 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 240 and may construct an image. The image acquirer may thus acquire images of sample 208. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on an imaging signal received from electron detection device 240. An imaging signal may correspond to a scanning operation for conducting charged particle imaging. An acquired image may be a single image comprising a plurality of imaging areas. The single image may be stored in the storage. The single image may be an original image that may be divided into a plurality of regions. Each of the regions may comprise one imaging area containing a feature of sample 208. The acquired images may comprise multiple images of a single imaging area of sample 208 sampled multiple times over a time sequence. The multiple images may be stored in the storage. In some embodiments, controller 109 may be configured to perform image processing steps with the multiple images of the same location of sample 208.

In some embodiments, controller 109 may include measurement circuitries (e.g., analog-to-digital converters) to obtain a distribution of the detected secondary electrons. The electron distribution data collected during a detection time window, in combination with corresponding scan path data of each of primary beamlets 211, 212, and 213 incident on the wafer surface, can be used to reconstruct images of the wafer structures under inspection. The reconstructed images can be used to reveal various features of the internal or external structures of sample 208, and thereby can be used to reveal any defects that may exist in the wafer.

In some embodiments, controller 109 may control motorized stage 209 to move sample 208 during inspection of sample 208. In some embodiments, controller 109 may enable motorized stage 209 to move sample 208 in a direction continuously at a constant speed. In other embodiments, controller 109 may enable motorized stage 209 to change the speed of the movement of sample 208 overtime depending on the steps of scanning process.

Although FIG. 2 shows that apparatus 104 uses three primary electron beams, it is appreciated that apparatus 104 may use two or more number of primary electron beams. The present disclosure does not limit the number of primary electron beams used in apparatus 104. In some embodiments, apparatus 104 may be a SEM used for lithography. In some embodiments, electron beam tool 104 may be a single-beam system or a multi-beam system.

Compared with a single charged-particle beam imaging system ("single-beam system"), a multiple charged-particle beam imaging system ("multi-beam system") may be designed to optimize throughput for different scan modes. Embodiments of this disclosure provide a multi-beam system with the capability of optimizing throughput for different scan modes by using beam arrays with different geometries, adapting to different throughputs and resolution requirements.

Figure 3:
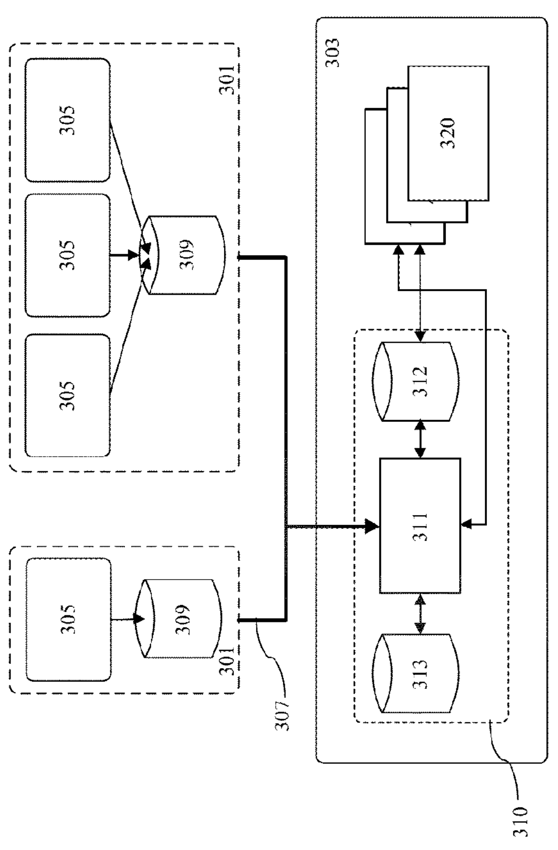
FIG. 3 is a schematic diagram of an exemplary system for distributed image recording and storage, consistent with embodiments of the present disclosure.

FIG. 3 illustrates a schematic diagram of a system 300 for distributed image recording and storage, consistent with embodiments of the present disclosure.

System 300 may include multiple clean rooms 301 (e.g., clean room environments) and a data center 303 (e.g., Nebula system). In some embodiments, clean room 301 may be one or more rooms that include one or more SEM tools (e.g., scanning charged particle microscope tools) 305 (e.g., electron beam tool 104 of FIGS. 1-2). In some embodiments, data center 303 may be physically separate from clean room 301.

In some embodiments, a speed of network 307 connected between SEM tools 305 and data center 303 may depend on a physical distance between the SEM tools 305 and data center 303. Clean room 301 may be separate from data center 303 since SEM tools 305 in clean room 301 are sensitive to their environment. In some embodiments, the space in clean room 301 may be limited.

In some embodiments, data center 303 may include an image data hub 310 and image data hub 310 may include an image hub server 311, image storage 312, and metadata database 313. Data center 303 may include application software 320 ("application") (e.g., one or more applications) designed to carry out tasks (e.g., as specified by one or more users) related to one or more SEM tools 305. For example, applications 320 may process images or analyze images generated by SEM tools 305 for inspection of wafers (e.g., defect detection on sample 208 of FIG. 2).

In some embodiments, clean room 301 may include an external storage rack (ESR) 309. ESR 309 may be a disk drive that may record data from one or more SEM tools 305. For example, ESR 309 may store SEM images generated by one or more SEM tools 305 during inspection of a wafer. In some embodiments, ESR 309 may be a high-speed (e.g., greater than or equal to 100 gigabit per second) storage system that may connect to one or more SEM tools 305 and record data from one or more SEM tools 305 simultaneously or substantially simultaneously in real-time (e.g., while one or more SEM tools are performing inspection on a wafer, generating images of the wafer, etc.) at high speed (e.g., greater than or equal to 100 gigabit per second). In some embodiments, ESR 309 may allow applications 320 to read images from ESR 309. In some embodiments, ESR 309 may exchange metadata of its stored images with image hub server 311. In some embodiments, ESR 309 may catalog the stored images. Moreover, while one ESR is associated with a single clean room, it is appreciated that each clean room can have its own ESR. Further, while FIG. 3 shows that the ESR is in a clean room, it is appreciated that the ESR can be outside of the clean room and is communicatively coupled to one or more SEM tools 305.

In some embodiments, network 307 between data center 303 and clean room 301 may have a standard speed (e.g., 1 gigabit per second) due to a distance (e.g., 2 kilometers) between data center 303 and clean room 301. In some embodiments, the network bandwidth or writing speed of ESR 309 (e.g., limited writing speed) may require image hub server 311 to control traffic between ESR 309 and image storage 312 to achieve higher throughput of images to applications 320 in real-time. For example, ESR 309 may communicate with image hub server 311 in order to control traffic of data between ESR 309 and applications 320. For example, ESR 309 may provide image hub server 311 access to its stored images.

In some embodiments, before SEM tool 305 begins generating images, SEM tool 305 may send data recording information to ESR 309. For example, data recording information may include SEM tool type or expected data throughput to ESR 309, which may be determined based on expected image size or expected frequency at which images may be generated during inspection (e.g., 100 megahertz, 400 megahertz, etc.). In some embodiments, data recording information may include various inspection settings related to SEM tool 305 (e.g., related to image generation frequency or image size).

Based on the data recording information, ESR 309 may determine whether it should begin recording data (e.g., generating images). For example, ESR 309 may have a maximum bandwidth (e.g., maximum storage writing throughput) of 10 gigabit per second. Each SEM tool of four SEM tools may be currently writing data to ESR 309 simultaneously. While the four SEM tools are simultaneously writing data to ESR 309 in real-time, a fifth SEM tool may send data recording information to ESR 309. ESR 309 may determine that it should not begin recording data from the fifth SEM tool since ESR 309 is currently operating at its maximum bandwidth.

In some embodiments, once ESR 309 records images from one or more SEM tools 305, image hub server 311 may retrieve metadata (e.g., SEM tool recording job start and end time during inspection, SEM tool name, SEM tool recipe information such as inspection settings or conditions, etc.) associated with each image recorded in ESR 309 and store the metadata in metadata database 313. In some embodiments, SEM tools 305 may generate metadata when it finishes recording images to ESR 309.

In some embodiments, application 320 may prioritize which images recorded in ESR 309 should be copied to image storage 312 based on a prioritization of inspection analyses application 320 needs to perform (e.g., a prioritization provided by a user). For example, images that may need to be analyzed by application 320 sooner may be copied from ESR 309 to image storage 312 sooner than images that need to be analyzed later.

In some embodiments, one or more applications 320 may determine (e.g., as specified by one or more users) that one or more images from one or more SEM tools 305 need to be obtained (e.g., for inspection analysis, defect detection, etc.). In some embodiments, application 320 may know image identifiers (e.g., image file names) of the images that need to be obtained but may not know the location of the images or the content of the images.

In some embodiments, application 320 may query image data locations (e.g., location of image content) from image hub server 311. For example, application 320 may know the image identifiers of the images needed for analysis, but application 320 may not know the location of the content of the images associated with the image identifiers. In some embodiments, application 320 may not know whether the images it needs are located in ESR 309 or located in image storage 312.

In some embodiments, image hub server 311 knows the locations of the images queried by application 320. In some embodiments, image hub server 311 may determine that at least one of the images application 320 needs to obtain is located in ESR 309. Image hub server 311 may communicate with ESR 309 to transfer at least one of these images from ESR 309 to image hub server 311. Image hub server 311 may transfer at least one of these images to application 320. In some embodiments, an image may comprise a plurality of images and a portion of the image may comprise one or more of the plurality of images.

In some embodiments, image hub server 311 may determine that at least one of the images that application 320 needs to obtain is located in image storage 312. In some embodiments, image hub server 311 may have transferred images from ESR 309 to image storage 312 (e.g., copied at least a portion of images recorded in ESR 309 in real-time to image storage 312) for non real-time access by application 320. For example, image hub server 311 may accumulate a plurality of images in image storage 312 from ESR 309 for inspection analysis that is remote from image generation by the one or more SEM tools 305. In some embodiments, image hub server 311 may have transferred images from ESR 309 to image storage 312 based on a prioritization of images (e.g., prioritization determined by metadata associated with at least one image).

In some embodiments, network traffic between clean room 301 and data center 303 may be low (e.g., idle). When network traffic between clean room 301 and data center 303 is low, image hub server 311 may transfer at least one image from ESR 309 to image storage 312 (e.g., caches) so that applications 320 in the future may quickly access images from image storage 312, thereby increasing image transfer throughput for inspection analysis. In some embodiments, application 320 may perform inspection analyses on the obtained SEM images.

Figure 4:
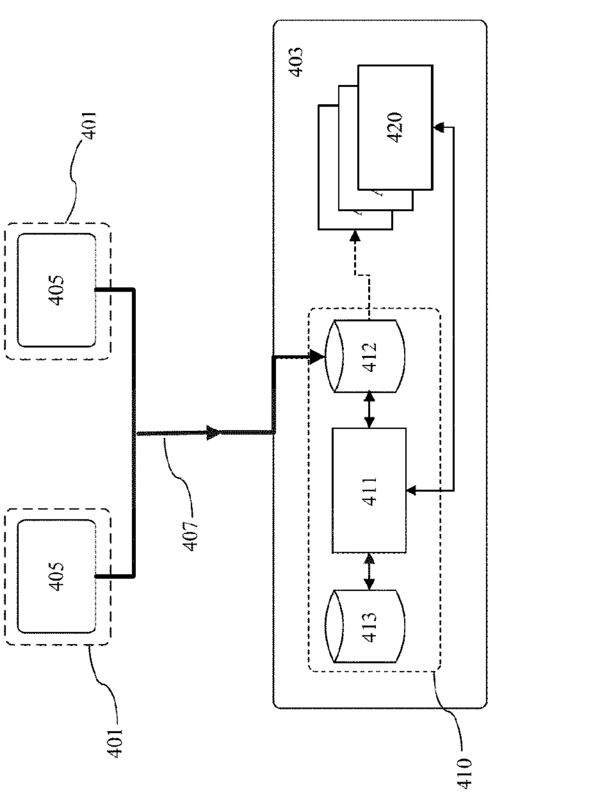
FIG. 4 is a schematic diagram illustrating an exemplary system for distributed image recording and storage, consistent with embodiments of the present disclosure.

FIG. 4 illustrates a schematic diagram of a system 400 for distributed image recording and storage, consistent with embodiments of the present disclosure. In some embodiments, a network 407 between multiple clean rooms 401 (e.g., clean room environments) and a data center 403 may be high-speed (e.g., InfiniBand, network speed greater than or equal to 100 gigabit per second, etc.). In some embodiments, data center 403 may include an image data hub 410 and one or more applications 420. Image data hub 410 may include an image hub server 411, an image storage 412, and a metadata database 413. In some embodiments, SEM tools (e.g., scanning charged particle microscope tools) 405 (e.g., electron beam tool 104 of FIGS. 1-2) may transfer images directly to image storage 412.

Image storage 412 may store SEM images generated by one or more SEM tools 405 during inspection of a wafer (e.g., sample 208 of FIG. 2). In some embodiments, image storage 412 may connect to one or more SEM tools 405 and record data from one or more SEM tools 405 simultaneously in real-time (e.g., while one or more SEM tools 405 are performing inspection on a wafer) over high-speed network. In some embodiments, image storage 412 may allow applications 420 to read images from image storage 412. In some embodiments, once image storage 412 records images from one or more SEM tools 405, image hub server 411 may retrieve metadata (e.g., SEM tool recording job start and end time during inspection, SEM tool name, SEM tool recipe information such as inspection settings or conditions, etc.) associated with each image recorded in image storage 412 and store the metadata in metadata database 413. In some embodiments, SEM tool 405 may generate metadata when it finishes recording image to ESR 409.

In some embodiments, one or more applications 420 may determine (e.g., as specified by one or more users) that one or more images from one or more SEM tools 405 need to be obtained (e.g., for inspection analysis, defect detection, etc.). In some embodiments, application 420 may know image identifiers (e.g., image file names) of the images that need to be obtained, but may not know the content of the images.

In some embodiments, application 420 may query image hub server 411 for the images. For example, application 420 may communicate the image identifiers of the images needed for analysis with image hub server 411, and image hub server 411 may directly transfer at least one of these images from image storage 412 to application 420.

Since network connection between clean room 401 and data center 403 may be high-speed, image hub server 411 may quickly transfer at least one image from image storage 412 to application 420, thereby increasing image transfer throughput for inspection analysis. In some embodiments, application 420 may perform inspection analyses on the obtained SEM images.

Figure 5:
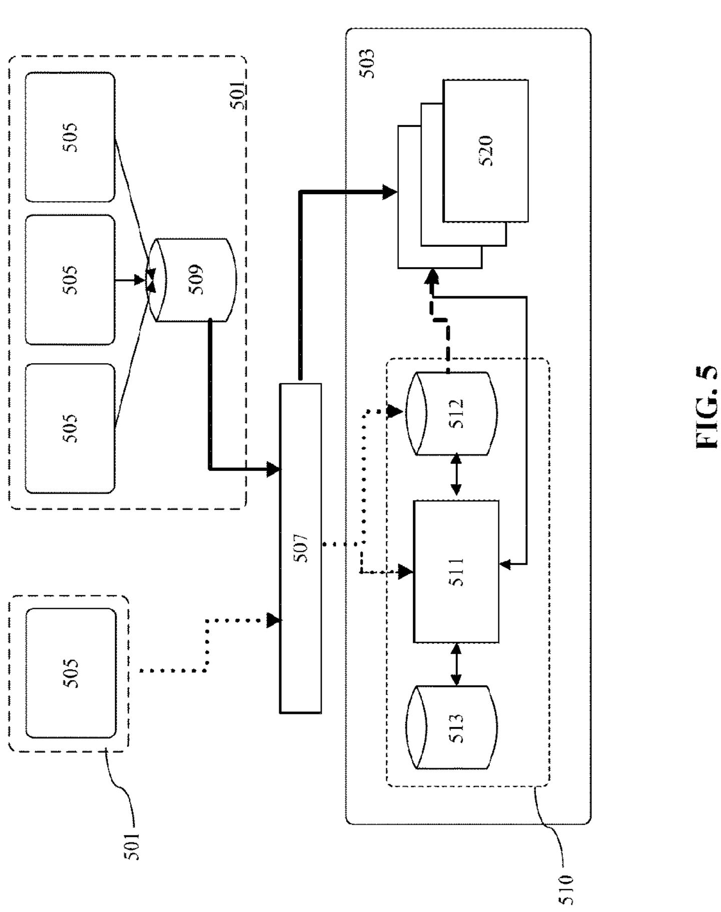
FIG. 5 is a schematic diagram illustrating an exemplary system for distributed image recording and storage, consistent with embodiments of the present disclosure.

FIG. 5 illustrates a schematic diagram of a system 500 for distributed image recording and storage, consistent with embodiments of the present disclosure.

In some embodiments, a network 507 between multiple clean rooms 501 (e.g., clean room environments) and a data center 503 may be high-speed (e.g., InfiniBand, network speed greater than or equal to 100 gigabit per second, etc.). In some embodiments, data center 503 may include one or more applications 520 and an image data hub 510. Image data hub 510 may include an image hub server 511, image storage 512, and metadata database 513. In some embodiments, at least one SEM tool 505 may transfer images directly to image storage 512 while other SEM tools (e.g., scanning charged particle microscope tools) 505 may record images to an ESR 509.

Image storage 512 may store SEM images generated by one or more SEM tools 505 during inspection of a wafer (e.g., sample 208 of FIG. 2). In some embodiments, image storage 512 may connect to one or more SEM tools 505 and record data from one or more SEM tools 505 simultaneously in real-time (e.g., while one or more SEM tools are performing inspection on a wafer) over a high-speed network 507. In some embodiments, image storage 512 may allow applications 520 to read images from image storage 512. In some embodiments, once image storage 512 records images from one or more SEM tools 505, image hub server 511 may retrieve metadata (e.g., SEM tool recording job start and end time during inspection, SEM tool name, SEM tool recipe information such as inspection settings or conditions, etc.) associated with each image recorded in image storage 512 and store the metadata in metadata database 513. In some embodiments, SEM tool 505 may generate metadata when it finishes recording images to ESR 509.

In some embodiments, clean room 501 may include ESR 509. ESR 509 may be a disk drive records data from one or more SEM tools 505. For example, ESR 509 may store SEM images generated by one or more SEM tools 505 during inspection of a wafer. In some embodiments, ESR 509 may be a high-speed (e.g., greater than or equal to 100 gigabit per second) storage system that may connect to one or more SEM tools 505 and record data from one or more SEM tools 505 simultaneously in real-time (e.g., while one or more SEM tools 505 are performing inspection on a wafer) at high speed (e.g., greater than or equal to 100 gigabit per second). In some embodiments, ESR 509 may allow applications 520 to read images from ESR 509. In some embodiments, ESR 509 may exchange metadata of its stored images with image hub server 511. In some embodiments, ESR 509 may catalog the stored images. Moreover, while one ESR is associated with a single clean room, it is appreciated that each clean room can have its own ESR. Further, while FIG. 5 shows that the ESR is in a clean room, it is appreciated that the ESR can be outside of the clean room and is communicatively coupled to one or more SEM tools 505.

In some embodiments, before SEM tool 505 begins generating images, SEM tool 505 may send data recording information to ESR 509. For example, data recording information may include SEM tool type or expected data throughput to ESR 509, which may be determined based on expected image size or expected frequency at which images may be generated during inspection (e.g., 100 megahertz, 400 megahertz, etc.). In some embodiments, data recording information may include various inspection settings related to a SEM tool (e.g., related to image generation frequency or image size).

Based on the data recording information, ESR 509 may determine whether it should begin recording data (e.g., generating images). For example, ESR 509 may have a maximum bandwidth (e.g., maximum storage writing throughput) of 10 gigabit per second. Each SEM tool of four SEM tools may be currently writing data to ESR 509 simultaneously. While the four SEM tools are simultaneously writing data to ESR 509 in real-time, a fifth SEM tool may send data recording information to ESR 509. ESR 509 may determine that it should not begin recording data from the fifth SEM tool since ESR 509 is currently operating at its maximum bandwidth.

In some embodiments, once ESR 509 records images from one or more SEM tools 505, image hub server 511 may retrieve metadata (e.g., SEM tool recording job start and end time during inspection, SEM tool name, SEM tool recipe information such as inspection settings or conditions, etc.) associated with each image recorded in ESR 509 and store the metadata in metadata database 513. In some embodiments, SEM tool 505 may generate metadata when it finishes recording images to ESR 509.

In some embodiments, one or more applications 520 may determine (e.g., as specified by one or more users) that one or more images from one or more SEM tools 505 need to be obtained (e.g., for inspection analysis, defect detection, etc.). In some embodiments, application 520 may know image identifiers (e.g., image file names) of the images that need to be obtained, but may not know the location of the images or the content of the images.

In some embodiments, application 520 may query image data locations (e.g., location of image content) from image hub server 511. For example, application 520 may know the image identifiers of the images needed for analysis, but application 520 may not know the location of the content of the images associated with the image identifiers. In some embodiments, application 520 may not know whether the images it needs are located in ESR 509 or located in image storage 512.

In some embodiments, image hub server 511 knows the locations of the images queried by application 520. In some embodiments, image hub server 511 may determine that at least one of the images applications 520 needs to obtain is located in ESR 509. Image hub server 511 may communicate with ESR 509 to transfer at least one of these images from ESR 509 to application 520. Image hub server 511 may transfer at least one of these images to application 520.

In some embodiments, image hub server 511 may determine that at least one of the images that application 520 needs to obtain is located in image storage 512 and directly transfers images from image storage 512 to application 520.

Since network 507 between clean room 301 and data center 503 may be high-speed, image hub server 511 may quickly and directly transfer at least one image from image storage 512 or ESR 509 to application 520, thereby increasing image transfer throughput for inspection analysis. In some embodiments, application 520 may perform inspection analyses on the obtained SEM images.

Figure 6:
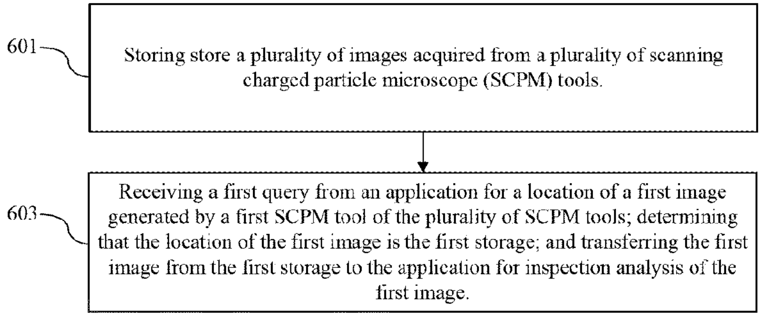
FIG. 6 is a flowchart illustrating an exemplary process for distributed image recording and storage, consistent with embodiments of the present disclosure.

Reference is now made to FIG. 6, a flowchart illustrating an exemplary process 600 of distributed image recording and storage, consistent with embodiments of the present disclosure. The steps of method 600 can be performed by a system (e.g., system 300 of FIG. 3, system 400 of FIG. 4, or system 500 of FIG. 5) executing on or otherwise using the features of a computing device (e.g., controller 109 of FIG. 1, data center 303 of FIG. 3, data center 403 of FIG. 4, data center 503 of FIG. 5, or any components thereof) for purposes of illustration. It is appreciated that the illustrated method 600 can be altered to modify the order of steps and to include additional steps that may be performed by the system.

At step 601, a first storage (e.g., image storage 312 of FIG. 3, image storage 412 of FIG. 4, or image storage 512 of FIG. 5) of a data center (e.g., data center 303 of FIG. 3, data center 403 of FIG. 4, or data center 503 of FIG. 5) may store a plurality of images acquired from a plurality of SCPM tools (e.g., SEM tools 305 of FIG. 3, SEM tools 405 of FIG. 4, or SEM tools 505 of FIG. 5) of a clean room environment (e.g., clean room 301 of FIG. 3, clean room 401 of FIG. 4, or clean room 501 of FIG. 5). In some embodiments, an image hub server (e.g., image hub server 311 of FIG. 3, image hub server 411 of FIG. 4, or image hub server 511 of FIG. 5) may transfer images directly from the plurality of SCPM tools to the first storage. In some embodiments, the image hub server may transfer images generated by the plurality of SCPM tools and recorded in a second storage (e.g., ESR 309 of FIG. 3 or ESR 509 of FIG. 5) to the first storage. In some embodiments, the image hub server may transfer images from the second storage to the first storage based on a prioritization of inspection analyses that are remote from image generation by the plurality of SCPM tools. In some embodiments, the second storage may be configured to record a plurality of images generated by the plurality of SCPM tools substantially simultaneously in real-time. In some embodiments, the second storage may be configured to record a plurality of images generated by the plurality of SCPM tools based on a bandwidth of the second storage.

At step 603, the image hub server may receive a query from an application (e.g., application 320 of FIG. 3, application 420 of FIG. 4, or application 520 of FIG. 5) for a location of a first image generated by a first SCPM tool of the plurality of SCPM tools; determine that the location of the first image is the first storage; and transfer the first image from the first storage to the application for inspection analysis of the first image.

In some embodiments, the application may query image data locations (e.g., location of image content) from the image hub server. For example, the application may know the image identifiers of the images needed for analysis, but the application may not know the location of the content of the images associated with the image identifiers. In some embodiments, the application may not know whether the images it needs are located in the first storage or located in the second storage.

In some embodiments, the image hub server may be configured to accumulate a plurality of images from the second storage in the first storage for inspection analysis that is remote from image generation by the plurality of SCPM tools. In some embodiments, the inspection analysis may comprise defect detection of a wafer (e.g., sample 208 of FIG. 2).

A non-transitory computer readable medium may be provided that stores instructions for a processor of a controller (e.g., controller 109 of FIG. 1) for controlling the electron beam tool or data centers (e.g., data center 303 of FIG. 3, data center 403 of FIG. 4, data center 503 of FIG. 5) of other systems and servers, or components thereof (e.g., image hub server 311 of FIG. 3, image hub server 411 of FIG. 4, or image hub server 511 of FIG. 5), consistent with embodiments in the present disclosure. These instructions may allow the one or more processors to carry out distributed image recording and storage, image processing, data processing, beamlet scanning, database management, graphical display, operations of a charged particle beam apparatus, or another imaging device, or the like. In some embodiments, the non-transitory computer readable medium may be provided that stores instructions for a processor to perform the steps of process 600. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

The embodiments may further be described using the following clauses:

1. A system for distributed image recording and storage for charged particle tools, the system comprising:
a first storage of a data center, the first storage configured to store a plurality of images acquired from a plurality of scanning charged particle microscope (SCPM) tools;
an image hub server of the data center, the image hub server configured to:
receive a first query from an application for a location of a first image generated by a first SCPM tool of the plurality of SCPM tools;
determine that the location of the first image is in the first storage; and
transfer the first image from the first storage to the application for inspection analysis of the first image.

2. The system of clause 1, wherein the image hub server is further configured to:
receive a second query from the application for a location of a second image generated by a second SCPM tool of the plurality of SCPM tools;
determine that the location of the second image is a second storage of a clean room environment; and
transfer the second image from the second storage to the application for inspection analysis of the second image.

3. The system of clause 1, wherein the image hub server is further configured to:
transfer the first image from a second storage of a clean room environment to the first storage prior to transferring the first image to the application.

4. The system of clause 3, wherein the image hub server is further configured to:
transfer the first image from the second storage to the first storage based on a prioritization of inspection analyses that are remote from image generation by the plurality of SCPM tools.

5. The system of any one of clauses 2-4, wherein the second storage is configured to record a plurality of images generated by the plurality of SCPM tools substantially simultaneously in real-time.

6. The system of clause 5, wherein the second storage is configured to record the plurality of images generated by the plurality of SCPM tools based on a bandwidth of the second storage.

7. The system of any one of clauses 2-6, wherein the image hub server is further configured to accumulate a plurality of images from the second storage in the first storage for inspection analysis that is remote from image generation performed by the plurality of SCPM tools.

8. The system of any one of clauses 2-7, wherein the first SCPM tool is located in a first clean room environment of a plurality of clean room environments and the second SCPM tool is located in a second clean room environment of the plurality of clean room environments.

9. The system of any one of clauses 1-8, wherein the second storage is a storage rack.

10. The system of any one of clauses 1-9, wherein the inspection analysis comprises defect detection of a wafer.

11. A method for distributing image recording and storage for charged particle tools, the method comprising:
storing a plurality of images acquired from a plurality of scanning charged particle microscope (SCPM) tools in a first storage of a data center;
receiving, by an image hub server of the data center, a first query from an application for a location of a first image generated by a first SCPM tool of the plurality of SCPM tools;
determining, by the image hub server of the data center, that the location of the first image is the first storage; and
transferring, by the image hub server of the data center, the first image from the first storage to the application for inspection analysis of the first image.

12. The method of clause 11, further comprising:
receiving, by the image hub server, a second query from the application for a location of a second image generated by a second SCPM tool of the plurality of SCPM tools;
determining, by the image hub server, that the location of the second image is a second storage of a clean room environment; and
transferring, by the image hub server, the second image from the second storage to the application for inspection analysis of the second image.

13. The method of clause 11, further comprising:
transferring, by the image hub server, the first image from a second storage of a clean room environment to the first storage prior to transferring the first image to the application.

14. The method of clause 13, further comprising:
transferring, by the image hub server, the first image from the second storage to the first storage based on a prioritization of inspection analyses that are remote from image generation by the plurality of SCPM tools.

15. The method of any one of clauses 12-14, further comprising recording, by the second storage, a plurality of images generated by the plurality of SCPM tools substantially simultaneously in real-time.

16. The method of clause 15, further comprising recording, by the second storage, the plurality of images generated by the plurality of SCPM tools based on a bandwidth of the second storage.

17. The method of any one of clauses 12-16, further comprising accumulating, by the image hub server, a plurality of images from the second storage in the first storage for inspection analysis that is remote from image generation performed by the plurality of SCPM tools.

18. The method of any one of clauses 12-17, wherein the first SCPM tool is located in a first clean room environment of a plurality of clean room environments and the second SCPM tool is located in a second clean room environment of the plurality of clean room environments.

19. The method of any one of clauses 11-18, wherein the second storage is a storage rack.

20. The method of any one of clauses 11-19, wherein the inspection analysis comprises defect detection of a wafer.

21. A non-transitory computer readable medium that stores a set of instructions that is executable by at least one processor of a data hub to cause the data hub to perform a method for distributed image recording and storage for charged particle tools, the method comprising:

storing a plurality of images acquired from a plurality of scanning charged particle microscope (SCPM) tools in a first storage of a data center;

receiving, by an image hub server of the data center, a first query from an application for a location of a first image generated by a first SCPM tool of the plurality of SCPM tools;

determining, by the image hub server of the data center, that the location of the first image is the first storage; and transferring, by the image hub server of the data center, the first image from the first storage to the application for inspection analysis of the first image.

22. The non-transitory computer readable medium of clause 21, the set of instructions that is executable by the at least one processor of the data hub to cause the data hub to further perform:

receiving, by the image hub server, a second query from the application for a location of a second image generated by a second SCPM tool of the plurality of SCPM tools;

determining, by the image hub server, that the location of the second image is a second storage of a clean room environment; and transferring, by the image hub server, the second image from the second storage to the application for inspection analysis of the second image.

23. The non-transitory computer readable medium of clause 21, the set of instructions that is executable by the at least one processor of the data hub to cause the data hub to further perform:

transferring, by the image hub server, the first image from a second storage of a clean room environment to the first storage prior to transferring the first image to the application.

24. The non-transitory computer readable medium of clause 23, the set of instructions that is executable by the at least one processor of the data hub to cause the data hub to further perform:

transferring, by the image hub server, the first image from the second storage to the first storage based on a prioritization of inspection analyses that are remote from image generation by the plurality of SCPM tools.

25. The non-transitory computer readable medium of any one of clauses 22-24, the set of instructions that is executable by the at least one processor of the data hub to cause the data hub to further perform:

recording, by the second storage, a plurality of images generated by the plurality of SCPM tools substantially simultaneously in real-time.

26. The non-transitory computer readable medium of clause 25, the set of instructions that is executable by the at least one processor of the data hub to cause the data hub to further perform:

recording, by the second storage, the plurality of images generated by the plurality of SCPM tools based on a bandwidth of the second storage.

27. The non-transitory computer readable medium of any one of clauses 22-26, the set of instructions that is executable by the at least one processor of the data hub to cause the data hub to further perform:

accumulating, by the image hub server, a plurality of images from the second storage in the first storage for inspection analysis that is remote from image generation performed by the plurality of SCPM tools.

28. The non-transitory computer readable medium of any one of clauses 22-27, wherein the first SCPM tool is located in a first clean room environment of a plurality of clean room environments and the second SCPM tool is located in a second clean room environment of the plurality of clean room environments.

29. The non-transitory computer readable medium of any one of clauses 21-28, wherein the second storage is a storage rack.

30. The non-transitory computer readable medium of any one of clauses 11-19, wherein the inspection analysis comprises defect detection of a wafer.

It will be appreciated that the embodiments of the present disclosure are not limited to the exact construction that has been described above and illustrated in the accompanying drawings, and that various modifications and changes may be made without departing from the scope thereof.

The invention claimed is:

1. A system for distributed image recording and storage for charged particle tools, the system comprising:

a first storage of a data center, the first storage configured to store a plurality of images acquired from a plurality of scanning charged particle microscope (SCPM) tools;

a second storage of a data center, the second storage configured to store metadata associated with the plurality of images and the plurality of SCPM tools, wherein the second storage is different from the first storage;

an image hub server of the data center, the image hub server configured to:

receive a first query from an application for a location of a first image generated by a first SCPM tool of the plurality of SCPM tools;

determine that the location of the first image is in the first storage based on metadata stored in the second storage associated with the first image; and transfer the first image from the first storage to the application for inspection analysis of the first image.

2. The system of claim 1, wherein the image hub server is further configured to:

receive a second query from the application for a location of a second image generated by a second SCPM tool of the plurality of SCPM tools;

determine that the location of the second image is a third storage of a clean room environment based on metadata stored in the second storage associated with the second image; and transfer the second image from the third storage to the application for inspection analysis of the second image.

3. The system of claim 2, wherein the third storage is configured to record a plurality of images generated by the plurality of SCPM tools substantially simultaneously in real-time.

4. The system of claim 3, wherein the third storage is configured to record the plurality of images generated by the plurality of SCPM tools based on a bandwidth of the third storage.

5. The system of claim 2, wherein the image hub server is further configured to accumulate a plurality of images from the third storage in the first storage for inspection analysis that is remote from image generation performed by the plurality of SCPM tools.

6. The system of claim 2, wherein the first SCPM tool is located in a first clean room environment of a plurality of clean room environments and the second SCPM tool is located in a second clean room environment of the plurality of clean room environments.

7. The system of claim 2, wherein the third storage is a storage rack.

8. The system of claim 1, wherein the image hub server is further configured to:

transfer the first image from a third storage of a clean room environment to the first storage prior to transferring the first image to the application.

9. The system of claim 8, wherein the image hub server is further configured to:

transfer the first image from the third storage to the first storage based on a prioritization of inspection analyses that are remote from image generation by the plurality of SCPM tools.

10. The system of claim 1, wherein the inspection analysis comprises defect detection of a wafer.

11. A method for distributing image recording and storage for charged particle tools, the method comprising:

storing a plurality of images acquired from a plurality of scanning charged particle microscope (SCPM) tools in a first storage of a data center;

storing metadata associated with the plurality of images and the plurality of SCPM tools in a second storage of a data center, wherein the second storage is different from the first storage;

receiving, by an image hub server of the data center, a first query from an application for a location of a first image generated by a first SCPM tool of the plurality of SCPM tools;

determining, by the image hub server of the data center, that the location of the first image is the first storage based on metadata stored in the second storage associated with the first image; and transferring, by the image hub server of the data center, the first image from the first storage to the application for inspection analysis of the first image.

12. The method of claim 11, further comprising:

receiving, by the image hub server, a second query from the application for a location of a second image generated by a second SCPM tool of the plurality of SCPM tools;

determining, by the image hub server, that the location of the second image is a third storage of a clean room environment based on metadata stored in the second storage associated with the second image; and transferring, by the image hub server, the second image from the third storage to the application for inspection analysis of the second image.

13. The method of claim 12, further comprising recording, by the third storage, a plurality of images generated by the plurality of SCPM tools substantially simultaneously in real-time.

14. A non-transitory computer readable medium that stores a set of instructions that is executable by at least one processor of a data hub to cause the data hub to perform a method for distributed image recording and storage for charged particle tools, the method comprising:

storing a plurality of images acquired from a plurality of scanning charged particle microscope (SCPM) tools in a first storage of a data center;

storing metadata associated with the plurality of images and the plurality of SCPM tools in a second storage of a data center, wherein the second storage is different from the first storage;

receiving, by an image hub server of the data center, a first query from an application for a location of a first image generated by a first SCPM tool of the plurality of SCPM tools;

determining, by the image hub server of the data center, that the location of the first image is the first storage based on metadata stored in the second storage associated with the first image; and transferring, by the image hub server of the data center, the first image from the first storage to the application for inspection analysis of the first image.

15. The non-transitory computer readable medium of claim 14, the set of instructions that is executable by the at least one processor of the data hub to cause the data hub to further perform:

receiving, by the image hub server, a second query from the application for a location of a second image generated by a second SCPM tool of the plurality of SCPM tools;

determining, by the image hub server, that the location of the second image is a third storage of a clean room environment based on metadata stored in the second storage associated with the second image; and transferring, by the image hub server, the second image from the third storage to the application for inspection analysis of the second image.

16. The non-transitory computer readable medium of claim 15, the set of instructions that is executable by the at least one processor of the data hub to cause the data hub to further perform:

recording, by the third storage, a plurality of images generated by the plurality of SCPM tools substantially simultaneously in real-time.

17. The non-transitory computer readable medium of claim 16, the set of instructions that is executable by the at least one processor of the data hub to cause the data hub to further perform:

recording, by the third storage, the plurality of images generated by the plurality of SCPM tools based on a bandwidth of the second storage.

18. The non-transitory computer readable medium of claim 15, the set of instructions that is executable by the at least one processor of the data hub to cause the data hub to further perform:

accumulating, by the image hub server, a plurality of images from the third storage in the first storage for inspection analysis that is remote from image generation performed by the plurality of SCPM tools.

19. The non-transitory computer readable medium of claim 14, the set of instructions that is executable by the at least one processor of the data hub to cause the data hub to further perform:

transferring, by the image hub server, the first image from a third storage of a clean room environment to the first storage prior to transferring the first image to the application.

20. The non-transitory computer readable medium of claim 19, the set of instructions that is executable by the at least one processor of the data hub to cause the data hub to further perform:

transferring, by the image hub server, the first image from the third storage to the first storage based on a prioritization of inspection analyses that are remote from image generation by the plurality of SCPM tools.

* * * * *